(12) United States Patent
Oruganty et al.

(10) Patent No.: US 12,271,442 B2
(45) Date of Patent: Apr. 8, 2025

(54) SEMANTIC IMAGE SEGMENTATION FOR COGNITIVE ANALYSIS OF PHYSICAL STRUCTURES

(71) Applicant: Genpact USA, Inc, New York, NY (US)

(72) Inventors: Krishna Dev Oruganty, Long Island, NY (US); Siva Tian, New York, NY (US); Amit Arora, Princeton, NJ (US); Edmond John Schneider, Henrico, VA (US)

(73) Assignee: Genpact USA, Inc., New York, NY (US)

( * ) Notice: Subject to any disclaimer, the term of this patent is extended or adjusted under 35 U.S.C. 154(b) by 347 days.

(21) Appl. No.: 17/390,303

(22) Filed: Jul. 30, 2021

(65) Prior Publication Data
US 2022/0036132 A1     Feb. 3, 2022

Related U.S. Application Data

(60) Provisional application No. 63/059,482, filed on Jul. 31, 2020.

(51) Int. Cl.
*G06F 18/214* (2023.01)
*G06F 18/20* (2023.01)
(Continued)

(52) U.S. Cl.
CPC ........ *G06F 18/214* (2023.01); *G06F 18/2163* (2023.01); *G06F 18/217* (2023.01);
(Continued)

(58) Field of Classification Search
CPC .. G06F 18/214; G06F 18/2163; G06F 18/217; G06F 18/24; G06F 18/285;
(Continued)

(56) References Cited

U.S. PATENT DOCUMENTS 10,467,760 B2 *  11/2019 Kim ....................... G06N 3/045
10,692,050 B2 *   6/2020 Taliwal .................. G06V 10/82
(Continued)

OTHER PUBLICATIONS

Ložnjak, Stjepan & Kramberger, Tin & Cesar, Ivan & Kovačević, Renata. (2020). Automobile Classification Using Transfer Learning on ResNet Neural Network Architecture. 10.19279/TVZ.PD.2020-8-1-18. (Year: 2020).*
(Continued)

*Primary Examiner* — Manav Seth
(74) *Attorney, Agent, or Firm* — Goodwin Procter LLP (57) ABSTRACT

Methods and computing apparatus are provided for training AI/ML systems and use of such systems for performing image analysis so that the damaged parts of a physical structure can be identified accurately and efficiently. According to one embodiment, a method includes selecting an AI/ML system of a particular type; and training the AI/ML system using a dataset comprising one or more auto-labeled
(Continued)

images. The auto-labeling was performed using the selected AI/ML system configured using a parts-identification model. The configuration of the trained AI/ML system is output as an improved parts-identification model.

32 Claims, 4 Drawing Sheets

(51) Int. Cl.
*G06F 18/21* (2023.01)
*G06F 18/24* (2023.01)
*G06T 7/00* (2017.01)
*G06N 3/04* (2023.01)

(52) U.S. Cl.
CPC ............ *G06F 18/24* (2023.01); *G06F 18/285* (2023.01); *G06T 7/0002* (2013.01); *G06N 3/04* (2013.01); *G06T 2207/20081* (2013.01); *G06T 2207/20084* (2013.01); *G06V 2201/08* (2022.01)

(58) Field of Classification Search
CPC ......... G06T 7/0002; G06T 2207/20081; G06T 2207/20084; G06N 3/04; G06N 3/044; G06N 3/045; G06N 3/047; G06N 3/08; G06N 5/04; G06V 2201/08; G06V 10/774; G06V 10/82; G06V 10/87; G06V 20/52

See application file for complete search history.

(56) References Cited

U.S. PATENT DOCUMENTS

| | | | | |
|---|---|---|---|---|
| 11,494,976 | B2* | 11/2022 | Chen | G06N 3/047 |
| 11,677,930 | B2* | 6/2023 | Keserich | G06V 20/56 |
| | | | | 348/148 |
| 11,887,064 | B2* | 1/2024 | Kim | G06T 7/0002 |
| 12,039,501 | B2* | 7/2024 | Nvs | G06Q 10/20 |
| 2019/0114781 | A1* | 4/2019 | Gao | G06T 7/194 |
| 2020/0364509 | A1* | 11/2020 | Weinzaepfel | G06F 18/214 |
| 2021/0049423 | A1* | 2/2021 | Hu | G06F 18/214 |
| 2021/0182713 | A1* | 6/2021 | Kar | G06N 20/20 |
| 2021/0342997 | A1* | 11/2021 | Malreddy | G06T 7/70 |
| 2022/0335647 | A1* | 10/2022 | Shrivastava | G06V 10/82 |

OTHER PUBLICATIONS

LoÅ¾njak, Stjepan & Kramberger, Tin & Cesar, Ivan & KovaÄeviÄ, Renata. (2020). Automobile Classification Using Transfer Learning on ResNet Neural Network Architecture. 10.19279/TVZ.PD.2020-8-1-18. (Year: 2020).*

* cited by examiner

SEMANTIC IMAGE SEGMENTATION FOR COGNITIVE ANALYSIS OF PHYSICAL STRUCTURES

CROSS-REFERENCE TO RELATED APPLICATIONS

This application claims priority to and benefit of U.S. Provisional Patent Application No. 63/059,482, entitled "Semantic Vehicle Parts Segmentation for Cognitive Vehicle Damage Assessment," filed on Jul. 31, 2020, the entire contents of which are incorporated herein by reference.

FIELD

This disclosure generally relates to artificial intelligence (AI) based/machine learning (ML) techniques to enhance computer vision and, in particular, to training and use of AI/ML systems to: improve accuracy and/or performance of analysis of damage to physical structures, e.g., vehicles, by analyzing images of the physical structures.

BACKGROUND

Physical structures, such as vehicles, boats, machinery in industrial plants, buildings, etc. often get damaged due to collisions, other accidents, storms, etc. One way to assess the damage and to determine whether repairing the structure is viable and, if so, the kinds of repair needed, is to have one or more inspectors to inspect the structure. This can be impractical and/or time consuming in many cases. Another way to do this analysis is to take images (photographs, generally) of the damaged structure and to evaluate the images manually to assess the damage and to determine the required repairs. This process can also be laborious, time consuming, and prone to errors. The errors in analysis can occur if the quality of the images is not adequate due to factors such as, but not limited to, inadequate light, incorrect angle, excessive or inadequate zoom factor, etc.

SUMMARY

Methods and systems for training AI/ML systems and use of such systems for performing image analysis, so that the damaged parts of a physical structure can be identified accurately and efficiently, are disclosed. According to one embodiment, a method includes selecting an AI/ML system of a particular type; and training the AI/ML system using a dataset comprising one or more auto-labeled images. The auto-labeling was performed using the selected AI/ML system configured using a parts-identification model. The configuration of the trained AI/ML system is output as an improved parts-identification model.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

DETAILED DESCRIPTION

The following disclosure provides different embodiments, or examples, for implementing different features of the subject matter. Specific examples of components and arrangements are described below to simplify the present disclosure. These are merely examples and are not intended to be limiting.

Various embodiments described herein feature a technique for processing and analysis of images of physical structures in order to assess damage to the structures. The analysis is performed by one or more artificial intelligence (AI) or machine learning (ML) based systems (collectively "AI/ML systems"). In particular, embodiments of the AI/ML systems are trained to recognize and identify a part of a structure from one or more images of the structure, where the recognized part may be damaged. The image(s) may show the entire structure or portion(s) thereof, typically including not one but several parts. One or more of these parts may be damaged.

Upon identification of specific part(s), it can be determined further whether those part(s) can be repaired, e.g., based on the scope of the damage, or need to be replaced. The discussion below uses a vehicle/car as an example of a physical structure that is analyzed and assessed, for the sake of convenience only. Embodiments of the technique are not so limited, however, and can be used to isolate and analyze changes in or damage to other structures, such as machinery, buildings, boats, etc.

In analyzing damage to a vehicle from images of the vehicle, one challenge is to semantically segment the parts of the vehicle exhibited in a vehicle image. This generally requires assigning every pixel in the image to one of the vehicle parts (e.g. body, window, lights, license plates, wheels, etc.). This is a peculiar image processing and analysis problem the solution to which can be a key component in cognitive insurance claims system, where photos of the damaged vehicle are evaluated and estimates of damage severity and repair cost may be generated e.g., using AI/ML systems.

Some techniques for performing image segmentation (generally understood as identifying different objects within a given image) are directed to segmentation or identification of whole objects such as an animal, a human, a bicycles, a car, a house, a tree, etc., within the given image. Many such technique do not recognize the components or parts of a particular object, such as the hood, windshield, or door or a car, or a pully-assembly or a gear-assembly in a machine, etc. Some techniques have employed hand tuned image segmentation algorithms such as Felzenshwalb segmentation and graph-cut algorithms.

Some ML techniques have used various deep learning algorithms trained for segmentation of images in available image databases such as PASCAL VOC (Visual Object Classification). For certain deep learning based segmentation techniques, their respective performance in analyzing the images in the PASCAL VOC database is listed in Table 1.

TABLE 1

Mean Intersection over Union (mIoU) over PASCALVOC 2012 dataset (VOC12)

| Model | mIoU |
|---|---|
| FCN | 62.2 |
| ParseNet | 69.8 |
| Conv & Deconv | 72.5 |
| FPN | X |
| PSPNet | 85.4 |
| Mask R- CNN | X |
| DeepLab | 79.7 |
| DeepLabv 3 | 86.9 |
| DeepLabv 3+ | 89.0 |
| PANet | X |
| EncNet | 85.9 |

The mIoU is a commonly used measure of the accuracy of an image segmentation technique. Table 1 shows that DeepLabv3+ appears to work well on the VOC12 data.

In one techniques, car parts segmentation problem was formulated as a landmark identification problem that was solved using graphical models trained using PASCAL VOC 2010 database (VOC10). Some other techniques used convolutional neural network (CNN) and/or conditional random field (CRF)-based neural network techniques to segment car images into 5 regions.

TABLE 2

The mIoU of two models for PASCAL-parts dataset on car-part segmentation

| Method | body | plates | lights | wheels | windows | back glass | Average |
|---|---|---|---|---|---|---|---|
| CNN | 73.4 | 41.7 | 42.2 | 66.3 | 61.0 | 67.4 | 58.7 |
| CNN + CRF | 75.4 | 35.8 | 36.1 | 64.3 | 61.8 | 68.7 | 57.0 |

In the PASCAL parts dataset, certain parts such as a car door, car body, etc., are merged into one "body" category, reducing the number of car parts to 5, as listed in Table 2, which shows that the accuracy of these techniques varied from part-to-part.

One problem with many of the techniques described above is that their performance was tested only on the PASCAL-parts database with car parts defined at a high level, and a maximum of 5 or 13 car parts. In reality, the number of external parts of a vehicle is typically much greater than 13, and can be 20, 30, or even more. Also, many of the techniques described above focused on the identification of car parts that are undamaged.

Image segmentation that can accurately identify the parts of a vehicle regardless the condition of the vehicle can be beneficial in cognitive vehicle damage assessment such as, e.g., in analyzing a car involved in an accident, a boat damaged by a storm, etc. In these cases, the images of a damaged vehicle, and portions of images corresponding to damaged parts do not match well with the corresponding images and image portions of undamaged vehicles and parts. Moreover, different instances of damage can be different, each resulting in a unique variation of the image or image portion showing an undamaged vehicle or parts.

In various embodiments, the techniques described herein can perform segmentation of damaged vehicles by accurately identifying the parts of such a vehicle, including damaged parts. The segmentation can be performed at a high level of granularity, e.g., identifying over 30 different external parts of a vehicle, including parts as small as a door handle.

Semantic car parts segmentation using an AI/ML system generally involves selecting the type of AI/ML system, training the system, and validating the system. The type can be an artificial neural network (ANN), a support vector machine (SVM), a random forest, etc. Selecting the type generally also involves selecting a subtype such as, e.g., in the case of ANNs, a CNN, a CRF, a combination of CNN and CRF, a convolutional recurrent neural network, a long/short term memory (LSTM) network, deep learning, etc. Deep convolutional networks, which is the regularized fully connected deep neural networks, are commonly employed for analyzing images, and may be used in various embodiments.

Figure 1:
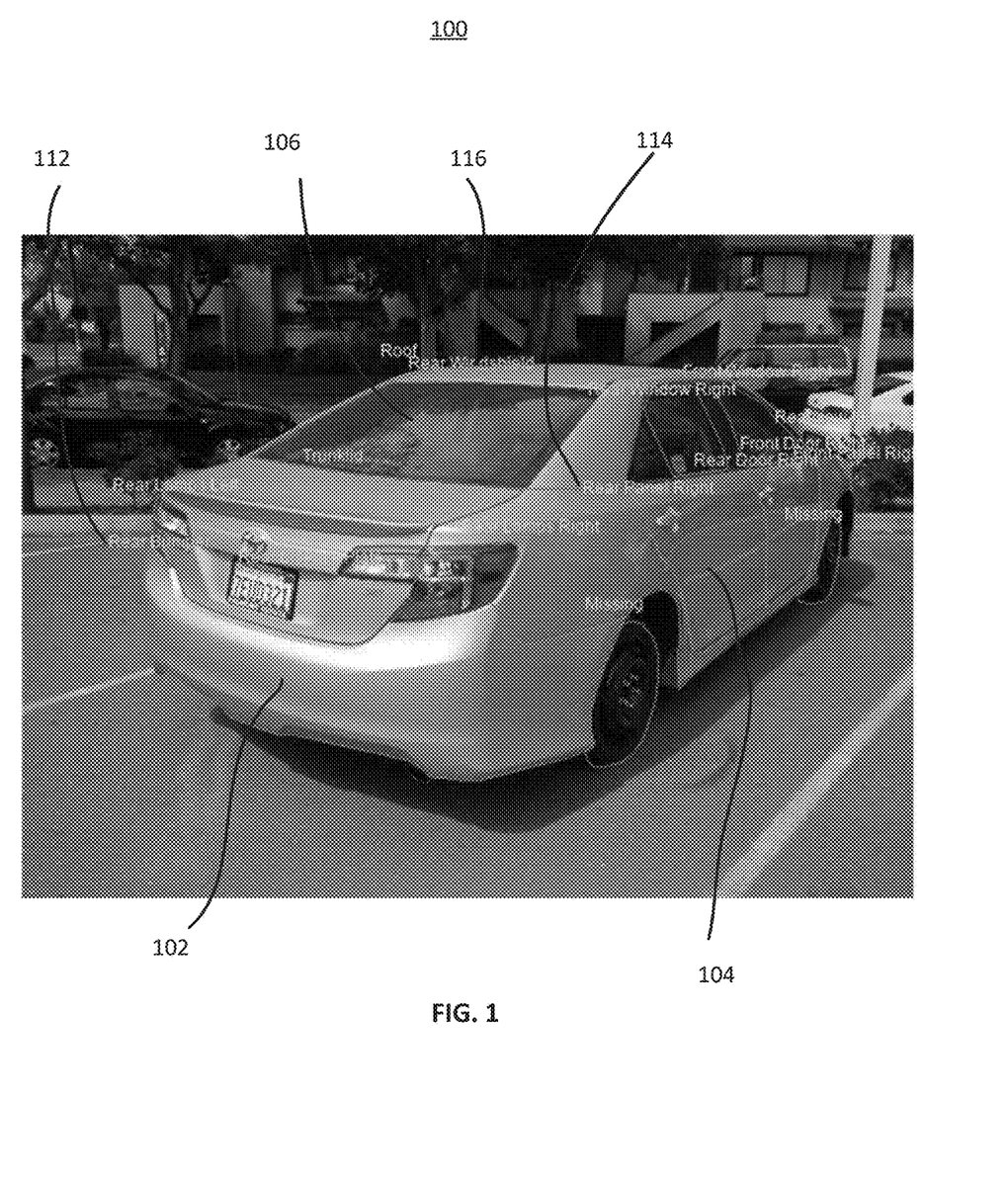
FIG. 1 depicts an example of a vehicle, its parts, and part labels.

Once the type of system is selected, an untrained system of the selected type is trained using what is commonly known as a training dataset. For segmentation of vehicle images, a training dataset generally includes images of vehicles, some of which may be damaged, where different parts of the vehicle are labeled, e.g., annotated manually. FIG. 1 shows an example of an annotated image 100, where an image of a car is divided (segmented) into portions 102, 104, 106, etc. Each portion corresponds to an identified part, indicated by labels 112, 114, 116, etc. The AI/ML system is asked to recognize these parts and feedback is provided to the system based on whether it detected the parts accurately. In successive iterations of the training phase, the AI/ML system may adapt based on the feedback and can improve its accuracy.

When a desired or specified level of accuracy is reached, the system is tested or validated using what is commonly known as a test dataset. Like a training dataset, a test dataset also includes images of vehicles, some of which may be damaged, where different parts of the vehicle are labeled, e.g., annotated manually. The trained system is asked to analyze these images, and a measure of how accurately the system identified the parts correctly is obtained. To obtain a fair measure, typically, the training and test datasets do not overlap, i.e., they generally do not contain the same images.

If the accuracy of the AI/ML system in analyzing the test dataset is low, e.g., less than a specified threshold, the system may be retrained or, in some cases, a different type of system may be selected. After retraining, the system is tested again, and the training and testing phases are repeated until the accuracy of the AI/ML system in analyzing the test dataset is adequate, i.e., meets or exceeds the specified threshold. An adequately trained AI/ML system can be used for inferencing, i.e., for analyzing and identifying parts in previously unseen images. The configuration of an adequately trained system can be stored as a parts-identification model. An untrained system of the same type as that of a trained system can be readily used for inferencing by configuring that system using a parts-identification model stored for the trained system.

In general, training and testing an AI/ML system requires a large number of manually labeled images because the accuracy of the system can be increased by training it over different kinds of images. Examples include, but are not limited to, images taken under different light conditions, at different angles, using different zoom factors, etc. In addition, different images may show different types of damages, such as a scratch, a dent, dislocation of a part, crumpled part, etc. Retraining and retesting may require an additional large number of manually labeled images.

In general, the more the labeled images available, the more accurate the AI/ML model can be, despite the type of AI/ML system used. Therefore, to achieve a high accuracy, a large number, e.g., thousands, hundreds of thousands, millions, etc., of labeled images are usually needed. Obtaining such a large number of labeled data at the pixel level can be a time consuming and labor-intensive task.

This disclosure presents an ensemble technique to analyze and detect car parts semantically. In order to provide a large training/test datasets, auto-labeling techniques such as synthetic image generation and/or distance labeling are employed in some embodiments, as discussed below. In some embodiments, a more focused and informed segmentation is facilitated via a hierarchical analysis, as discussed next.

Figure 2:
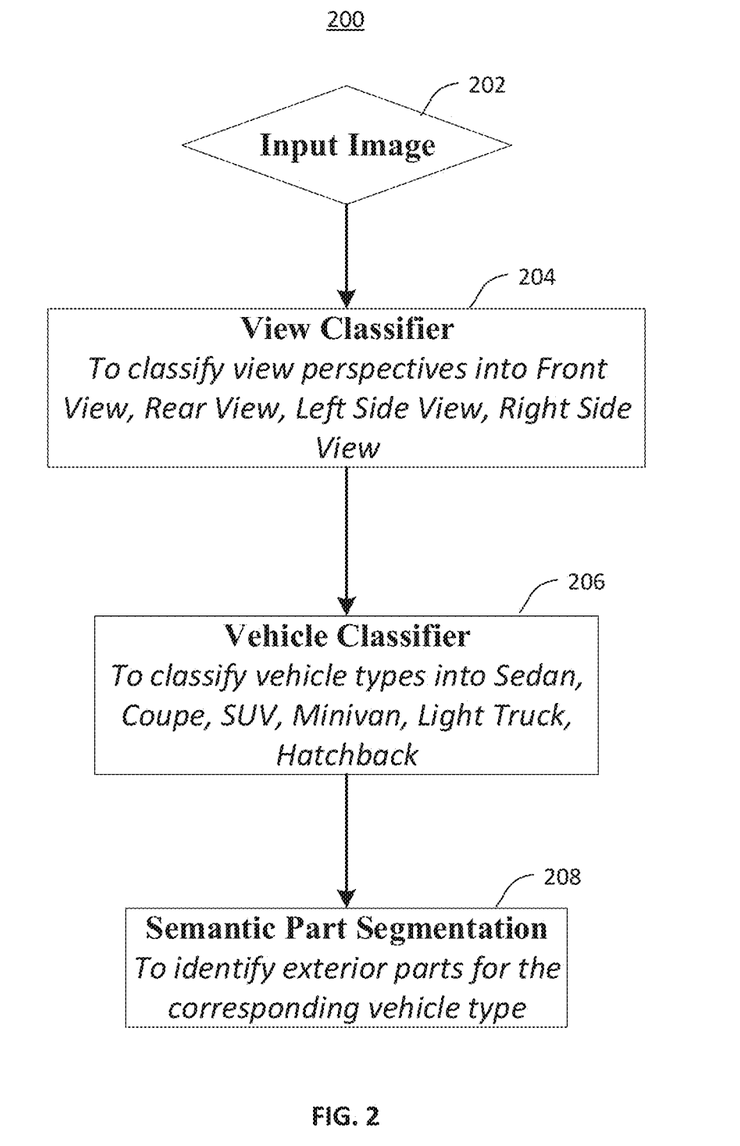
FIG. 2 is a flow chart of an exemplary artificial intelligence/machine learning (AI/ML) based process for identifying parts of a vehicle, according to some embodiments.

FIG. 2 is a flow chart of hierarchical analysis, according to one embodiment. In a segmentation process 200, an image is received at step 202. The orientation of the image, e.g., whether the front, rear, left, or right side of the vehicle is seen in the image, is determined at step 204 before performing segmentation. In step 206, the type of the vehicle, e.g., whether it is a sedan, a hatchback, a minivan, a sports utility vehicle (SUV), or a pickup truck, is determined before performing segmentation. Segmentation of the image into vehicle parts is then performed in step 208. In some embodiments, step 206 can be performed concurrently with step 204 or before step 204.

An AI/ML based parts-identification model specifically trained for or customized for a particular perspective and/or a particular vehicle type may be used in step 208. For example, one parts-identification model may be used for analysis of images of SUVs while another one for sedans, and yet another one for minivans. In some cases, an even more specific model, such as a model for the left side of a sedan, may be used. The use of such specific or customized models can increase the accuracy of detecting parts, especially damaged parts, in the images. Thus, a segmentation in step 208 that is based on the knowledge of the view perspective (orientation) and/or the vehicle type, as represented by a customized model used, can be more accurate than that performed without the knowledge of such information.

In order to determine the perspective or orientation, an AI/ML system or perspective-identification model can be used. Such a system, or a system configured using the perspective-identification model may be referred to as a perspective classifier. The perspective-identification model can be obtained by training an AI/ML system, as described above, but not to recognize and identify parts, but simply to recognize the orientation/perspective of the image. The same or a different AI/ML system or model can be used to classify a vehicle into different types. Here again, a type-classification model can be obtained by training an AI/ML system, as described above, to recognize the type of the vehicle. The AI/ML system, or a system configured using a type-classification model, may be referred to as a structure-type classifier, e.g., a vehicle-type classifier. A vehicle type can also be determined based on the vehicle identification number (VIN), if available.

The technique described with reference to FIG. 2 may be beneficially employed during inferencing, to improve segmentation accuracy. Alternatively, or in addition, an AI/ML model used in step 206 can itself be made more accurate by training the AI/ML system using an auto-labeled dataset, as described with reference to FIG. 3. In the process 300 shown in FIG. 3, an image is received in step 302. In step 304, the image is analyzed manually, to determine whether the image shows a vehicle. Upon determining that a vehicle is shown in the image, various parts of the vehicle (e.g., door, rear bumper, front right headlight, etc.) are identified and labeled, to provide a manually annotated or labeled image for the training/test datasets.

Figure 3:
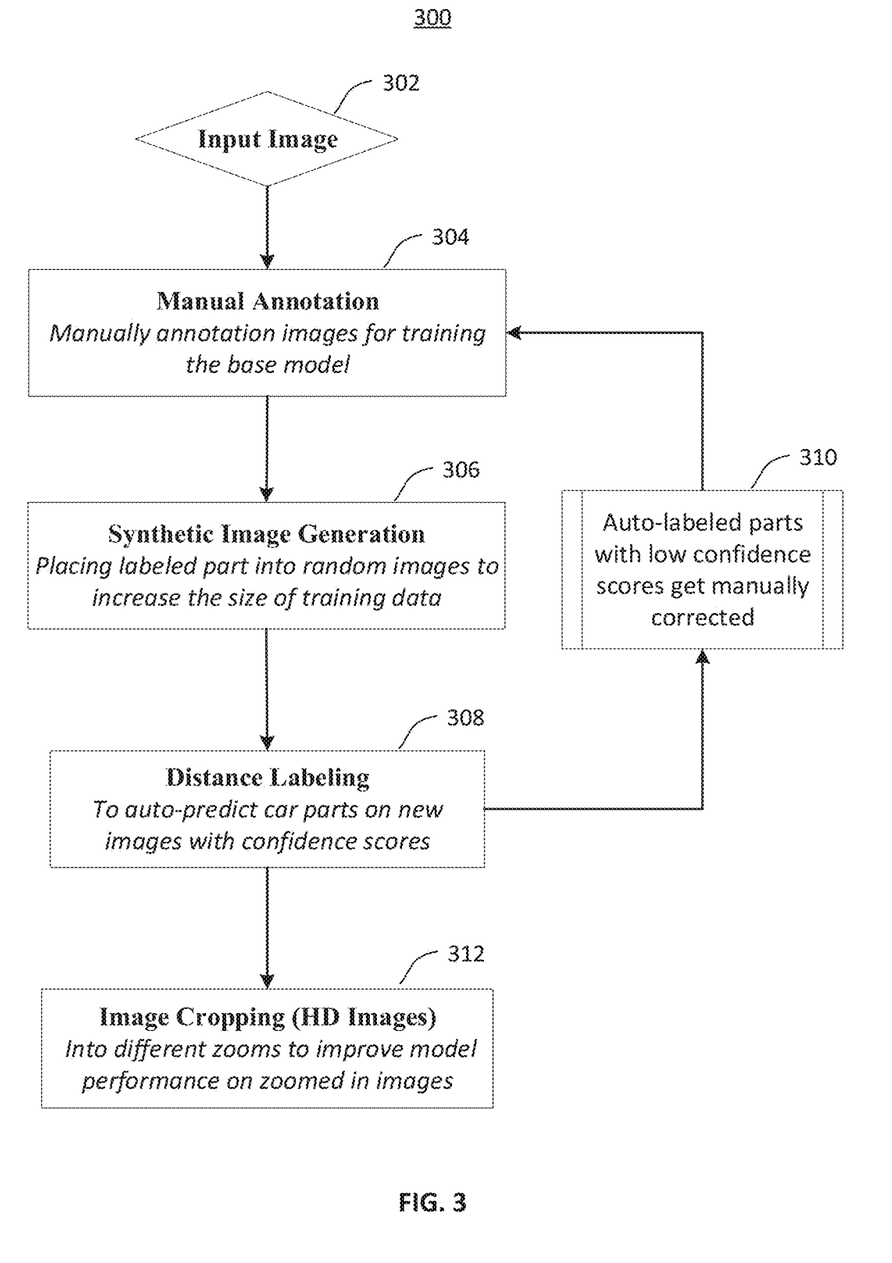
FIG. 3 is flow chart of a process for training an AI/ML system for identifying parts of a vehicle, according to some embodiments.

Using the labeled image, several (e.g., a few, a few tens, hundreds, etc.) synthetic images are generated in step 306. For example, a synthetic image can be generated by taking a group of individually labeled car parts (in correct relative orientation) from the image labeled in step 304, and by placing one or more of those parts into another background image. In some cases, the relative orientation of the parts can be changed, representing a different type of damage to or deformation of the vehicle.

A synthetic image can also be generated by selecting only a subset of the labeled parts and including them in a new image, and/or by changing the orientation of the labeled parts and by constructing a new image using the reoriented parts. The orientation of a labeled part can be changed by applying image rotation to the pixels corresponding to the labeled part. In some cases, a synthetic image can be generated by changing the viewing angle of the labeled parts via image projection, and by including the parts having a different viewing angle in a new image. In another cases, a synthetic image can be generated by changing background, by changing the background light, by adding noise, etc.

In step 308, the synthetically generated images are labeled using an initial or a current version of the AI/ML system or model, which may only be partially trained. These labeled images may be called auto-labeled images because they are labeled by an AI/ML system and not by a human. Since the synthetic images are variants of manually labeled images, the former can be relatively more similar, e.g., in terms of visual perception, to the corresponding manually labeled image compared to an entirely independent image, which may show a different vehicle, different parts, etc. As such, the auto-labeling may also be referred to as distance labeling.

In some embodiments, the AI/ML system is configured to generate a confidence score based on, e.g., size and geometry constraints, for its labeling. For example, geometry constraints of a vehicle inform that it is unlikely that the hood and the reflective glass portion of a sideview mirror would be seen from the same orientation. A size constraint may inform that what is labeled as a bumper may likely be an accent on a door. The auto-labeled images that have a high confidence score (e.g., greater than or equal to a specified threshold) can be added to the training/test datasets, to enrich the datasets.

Moreover, the auto-labeled images having a low confidence score can be labeled manually in step 310, and added to the training/test datasets. The later type of images may still be referred to as auto-labeled, even though they are subsequently labeled manually. These later type of images can be particularly beneficial in improving the accuracy of the AI/ML system model because the initial/current version of the system/model did not analyze those images with a high confidence score and may have mis-labeled such images. In one experiment, In one embodiment, from a model trained on 500 images, a further 1000 images were auto-labeled within a day.

In some embodiments, instead of confidence scores, manual inspection was used to select auto-labeled images with good parts inferencing. In this context, inferencing is considered to be good if it matches that my a human. The auto-labeled images lacking good inferencing may be re-labeled manually in step 310. Thus, both types of auto-labeled images, those that are not re-labeled and those that are, regardless of whether confidence scores are used to determine whether re-labeling is needed, can be added to and enrich the training/test datasets. As noted above, with a larger training dataset, an AI/ML based parts segmentation technique generally results in a higher accuracy.

In some embodiments, high-definition (HD) quality manually labeled images, e.g., those generated in step 304, are used to derive smaller cropped images with only a few parts visible in step 312. The smaller cropped images are then used for training, in order to improve accuracy of the AI/ML system or model in analyzing zoomed-in images. Explicitly cropping the images can increase the accuracy of the AI/ML models in comparison to auto-cropping, e.g., that employed in Deeplab training of models.

Figure 4A:
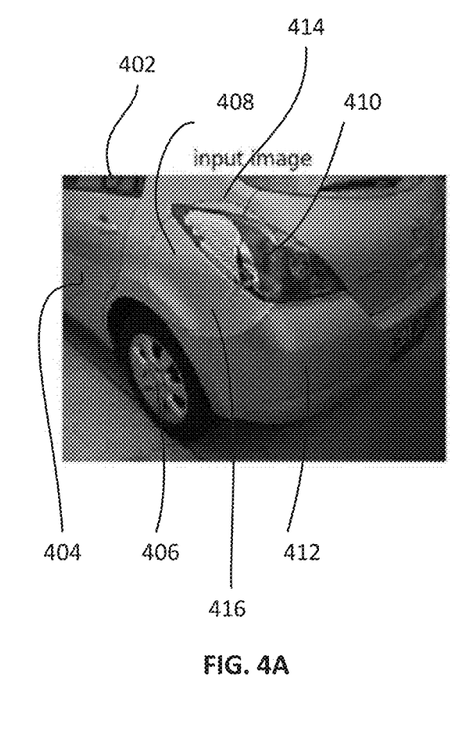
FIGS. 4A-4C identification of parts in a cropped image, according to various embodiments.
Figure 4B:
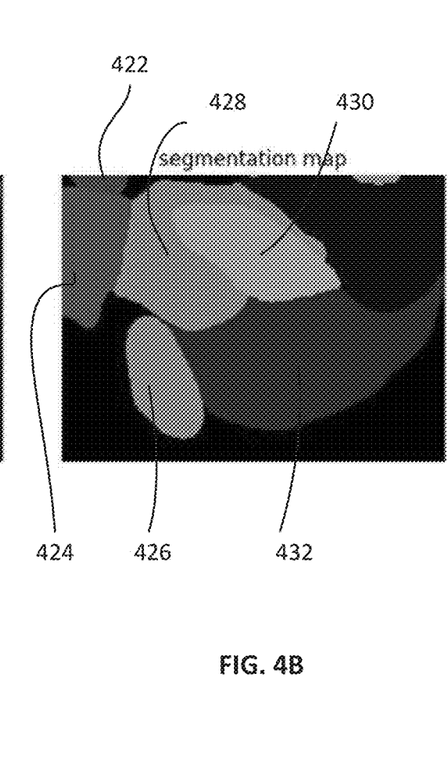
Figure 4C:
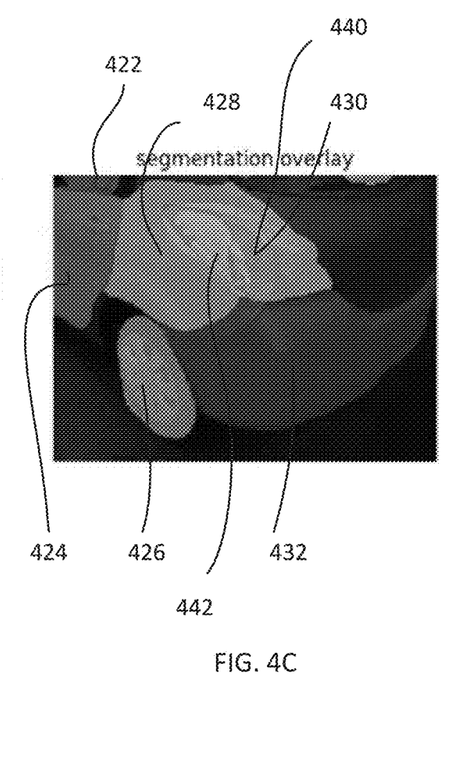

FIGS. 4A-4C show an example of segmentation of a cropped, zoomed-in image. FIG. 4A shows a cropped, zoomed-in image 402 of a portion of a car. The image 402 shows a part of the rear, left door 404, left rear, left wheel 406, a part of the body 408, the rear, left side indicator 410, and a part of the rear bumper 412. These parts are segmented and identified in FIG. 4B as segments 424-432, respectively, in the segmentation map 422.

In FIG. 4A, the circle 414 marks a damaged region 416 showing that the rear, left side indicator 410 is broken. This is indicated in FIG. 4C, where the image 402 and the segmentation map are overlaid. The segment 420 includes regions 440 and 442, where the region 440 corresponds to the intact portion of the rear, left side indicator 410, and the region 442 corresponds to the broken portion of rear, left side indicator 410. In some embodiments, these regions may not be identified while analyzing an uncropped image corresponding to the cropped image 402. As such, the part 410 may not be identified correctly or may not be identified as broken or damaged.

The regions 440 and 442 may be identified within the segment 430, however, while analyzing the cropped image 402. Accordingly, the corresponding part 410 may be inferred, correctly, as damaged. Therefore, in some embodiments, the corresponding auto-labeled version of the cropped images provided in step 312 (FIG. 3) may be added to the training/test datasets to enrich these datasets.

Various embodiments described above feature enhanced segmentation to improve granularity and/or accuracy of identification of vehicle parts, which can yield more accurate repair estimates. For example, one embodiment employs an AI/ML model trained to perform car part segmentation for 35 exterior car parts for a typical sedan, where the prats include: Left Fender, Right Fender, Front Bumper, Left Front Door, Right Front Door, Left Front Lamps, Right Front Lamps, Grille, Hood, Deck Lid, Left Quarter Panel, Right Quarter Panel, Rear Bumper, Left Rear Door, Right Rear Door, Left Rear Lamps, Right Rear Lamps, Roof, Left Front Wheels, Right Front Wheels, Left Rear Wheels, Right Rear Wheels, Windshield, Back Glass, Left Rear View Mirror, Right Rear View Mirror, Front License Plate, Back License Plate, Left Front Door Glass, Right Front Door Glass, Left Rear Door Glass, Right Rear Door Glass, Left Quarter Panel Glass, Right Quarter Panel Glass, and Door Handle.

Other embodiments employ different AI/ML models that are customized for other types of vehicles and their parts. Part labeling and identification based thereon may be performed using industry convention for part names, manufacturer-specified part names, etc. Table 3 shows a comprehensive, though not necessarily exhaustive, list of vehicle part names for six types of vehicles that various embodiments can identify. It should be understood that different embodiments can be trained for other types of vehicles (structures, in general) and/or for different listings of parts.

TABLE 3

An example list of part names for six types of vehicles

| Coupe | Hatchback | Minivan | Sedan | SUV | Truck |
|---|---|---|---|---|---|
| Left Fender | Left Fender | Left Fender | Left Fender | Left Fender | Left Fender |
| Right Fender | Right Fender | Right Fender | Right Fender | Right Fender | Right Fender |
| Front Bumper | Front Bumper | Front Bumper | Front Bumper | Front Bumper | Front Bumper |
| Left Front Door | Left Front Door | Left Front Door | Left Front Door | Left Front Door | Left Front Door |
| Right Front Door | Right Front Door | Right Front Door | Right Front Door | Right Front Door | Right Front Door |
| Left Front Lamps | Left Front Lamps | Left Front Lamps | Left Front Lamps | Left Front Lamps | Left Front Lamps |
| Right Front Lamps | Right Front Lamps | Right Front Lamps | Right Front Lamps | Right Front Lamps | Right Front Lamps |
| Grille | Grille | Grille | Grille | Grille | Grille |
| Hood | Hood | Hood | Hood | Hood | Hood |
| Deck Lid | Lift Gate | Lift Gate | Deck Lid | Lift Gate | Tail Gate |
| Left Quarter Panel | Left Quarter Panel | Left Quarter Panel | Left Quarter Panel | Left Quarter Panel | Left Quarter Panel |
| Right Quarter Panel | Right Quarter Panel | Right Quarter Panel | Right Quarter Panel | Right Quarter Panel | Right Quarter Panel |
| Rear Bumper | Rear Bumper | Rear Bumper | Rear Bumper | Rear Bumper | Rear Bumper |
| | Left Rear Door | Left Side Loading Door | Left Rear Door | Left Rear Door | Left Rear Door |
| | Right Rear Door | Right Side Loading Door | Right Rear Door | Right Rear Door | Right Rear Door |
| Left Rear Lamps | Left Rear Lamps | Left Rear Lamps | Left Rear Lamps | Left Rear Lamps | Left Rear Lamps |
| Right Rear Lamps | Right Rear Lamps | Right Rear Lamps | Right Rear Lamps | Right Rear Lamps | Right Rear Lamps |
| Roof | Roof | Roof | Roof | Roof | Roof |
| Left Front | Left Front | Left Front | Left Front | Left Front | Left Front |

TABLE 3-continued

An example list of part names for six types of vehicles

| Coupe | Hatchback | Minivan | Sedan | SUV | Truck |
|---|---|---|---|---|---|
| Wheels Right Front | Wheels Right Front | Wheels Right Front | Wheels Right Front | Wheels Right Front | Wheels Right Front |
| Wheels Left Rear | Wheels Left Rear | Wheels Left Rear | Wheels Left Rear | Wheels Left Rear | Wheels Left Rear |
| Wheels Right Rear | Wheels Right Rear | Wheels Right Rear | Wheels Right Rear | Wheels Right Rear | Wheels Right Rear |
| Wheels Windshield | Wheels Windshield | Wheels Windshield | Wheels Windshield | Wheels Windshield | Wheels Windshield |
| Back Glass | Back Glass | Back Glass | Back Glass | Back Glass | Back Cab Glass Pickup Box |
| Left Rear View Mirror | Left Rear View Mirror | Left Rear View Mirror | Left Rear View Mirror | Left Rear View Mirror | Left Rear View Mirror |
| Right Rear View Mirror | Right Rear View Mirror | Right Rear View Mirror | Right Rear View Mirror | Right Rear View Mirror | Right Rear View Mirror |
| Front License Plate | Front License Plate | Front License Plate | Front License Plate | Front License Plate | Front License Plate |
| Back License Plate | Back License Plate | Back License Plate | Back License Plate | Back License Plate | Back License Plate |
| Left Door Glass | | | | | Left Door Glass* |
| Right Door Glass | | | | | Right Door Glass* |
| | Left Front Door Glass | Left Front Door Glass | Left Front Door Glass | Left Front Door Glass | Left Front Door Glass |
| | Right Front Door Glass | Right Front Door Glass | Right Front Door Glass | Right Front Door Glass | Right Front Door Glass |
| | Left Rear Door Glass | Left Rear Door Glass | Left Rear Door Glass | Left Rear Door Glass | Left Rear Door Glass |
| | Right Rear Door Glass | Right Rear Door Glass | Right Rear Door Glass | Right Rear Door Glass | Right Rear Door Glass |
| Left Quarter Panel Glass | Left Quarter Panel Glass | Left Quarter Panel Glass | Left Quarter Panel Glass | Left Quarter Panel Glass | Left Cab Glass |
| Right Quarter Panel Glass | Right Quarter Panel Glass | Right Quarter Panel Glass | Right Quarter Panel Glass | Right Quarter Panel Glass | Right Cab Glass |
| Door Handle | Door Handle | Door Handle | Door Handle | Door Handle | Door Handle |

Various embodiments described herein feature one or more of:
1. Recognition of parts of a physical structure (e.g., car parts, boat parts, parts of machinery, etc.), taking into account different subtypes of a particular type of structure (e.g., different types of road vehicles such as, e.g., sedan, coupe, SUV, pickup truck, minivan, and hatchback).
2. Identification of parts of a damaged structure, where one or more parts may be damaged.
3. Identification of one or more parts of a structure that may appear only partially in zoomed-in images.
4. Training an AI/ML system on a relatively small number of manually labeled images, while achieving accuracy that is comparable to that of algorithms trained on far greater numbers, e.g., tens of thousands, of manually labeled images.

Inferencing, e.g., identification of parts of a structure, according to various embodiments described herein can be used in many different contexts. Two examples, that are not limiting, are provided below for illustration only.

Insurance claims: When a car accident occurs, the victim(s) may call the insurance carrier and file a First Notice of Loss (FNOL). Then the insurance carrier may send an adjuster to the accident scene, examine the car(s) and create a report along with photos. This manual report along with photos of the damaged vehicles may be sent to a reviewer at the insurance carrier. The reviewer may review the profile and provide an estimate of repair cost. Using the AI/ML-based embodiments described herein, this whole process can be performed more efficiently and virtually in real-time (e.g., within seconds or minutes, instead of days after the accident picture(s) are provided to an AI/ML based system, which may be hosted on the insurance carrier's proprietary computing environment and/or in a public or private cloud computing environment. Examining the photos using computer vision can not only be faster but also can be more accurate. As such, various embodiments described herein can be a key part of an end-to-end technique to use AI/ML to perform cognitive analysis in processing insurance claims, where damaged parts are identified accurately via image analysis, and repair cost associated with such parts can be calculated.

Lease-end car assessment: When returning a leased car to the dealer, the dealer may assess the condition of the car and charge the lessee accordingly, if there are damages exceeding the size/number threshold according to the lease guidelines. The thresholds typically include a certain number of dings on a car part, a certain length of scratch, etc. The analysis performed by a human can be subjective. Various embodiments can be a key part of an AI-based end-to-end solution to evaluate the condition of a vehicle upon lease termination. The AI/ML based identification of damaged parts may be objective, can be performed in real-time, and can minimize errors in this analysis.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A computer-implemented method, comprising:
    selecting an artificial intelligence or machine learning (AI/ML) system of a particular type customized for identifying parts of a particular orientation or a particular structure type;
    configuring the selected AI/ML system using a parts-identification model stored for a previously-trained AI/ML system of the particular type;
    performing auto-labeling to generate one or more auto-labeled images using the selected AI/ML system based at least on one of the orientation or structure type;
    generating a confidence score for labeling the one or more auto-labeled images based on one of a size constraint or a geometry constraint;
    training the AI/ML system using a dataset comprising the one or more auto-labeled images having a respective confidence score exceeding a specified threshold; and
    outputting and storing configuration of the trained and selected AI/ML system as an improved parts-identification model.

2. The computer-implemented method of claim 1, wherein the type of the AI/ML system comprises a convolutional neural network, convolutional recurrent neural network, or a deep-learning network.

3. The computer-implemented method of claim 1, wherein the dataset comprises a training dataset comprising at least one of the one or more auto-labeled images.

4. The computer-implemented method of claim 1, wherein the dataset comprises a test dataset comprising at least one of the one or more auto-labeled images.

5. The computer-implemented method of claim 1, further comprising:
    receiving a labeled image comprising one or more labeled parts; and
    generating a synthetic image using at least one of the one or more labeled parts, wherein the generating step comprises rotating the at least one labeled part or changing a background of the at least one labeled part.

6. The computer-implemented method of claim 1, further comprising:
    receiving a labeled image comprising one or more labeled parts; and
    generating a synthetic image using at least two of the one or more labeled parts, wherein the generating step comprises reorienting the at least two labeled parts relative to each other.

7. The computer-implemented method of claim 1, further comprising:
    receiving a labeled image comprising one or more labeled parts; and
    generating a synthetic image using at least one of the one or more labeled parts and by cropping the received labeled image.

8. The computer-implemented method of claim 1, further comprising:
    receiving a labeled image comprising one or more labeled parts;
    generating a synthetic image using at least one of the one or more labeled parts; and
    labeling the synthetic image using the selected AI/ML system configured using the parts-identification model.

9. The computer-implemented method of claim 1, wherein at least one of the one or more auto-labeled images comprises a structure, and the structure comprises a vehicle.

10. A computer-implemented method, comprising:
    receiving an input image of a structure and obtaining a type of the structure;
    selecting an artificial intelligence or machine learning (AI/ML) based system customized for the type of the structure, wherein the selecting includes configuring the untrained AI/ML based system using a parts-identification model derived from a previously-trained AI/ML system that is customized for identifying the type of the structure; and
    identifying and auto-labeling one or more parts of the structure in the input image using the AI/ML based system, wherein the auto-labeling includes generating a confidence score for labeling the one or more parts of the structure based on one of a size constraint or a geometry constraint and using labeling data along with the confidence score in training the AI/ML system.

11. The computer-implemented method of claim 10, wherein obtaining the type of the structure comprises:
    using a structure-type classifier, trained to identify structure types from structure images, identifying the type of the structure from the input image.

12. The computer-implemented method of claim 10, further comprising:
    determining a perspective of the input image; and
    providing the perspective to the AI/ML based system, wherein the AI/ML based system is configured to identify the one or more parts of the structure using the perspective.

13. The computer-implemented method of claim 12, wherein the perspective comprises a front perspective, a rear perspective, a left side perspective, or a right side perspective.

14. The computer-implemented method of claim 12, wherein determining the perspective comprises using a perspective classifier.

15. The computer-implemented method of claim 10, wherein selecting the AI/ML based system comprises configuring an untrained AI/ML based system using an AI/ML based parts-identification model that is customized for the type of the structure and that is trained for identifying one or more structure parts from one or more structure images.

16. The computer-implemented method of claim 10, wherein the structure comprises a vehicle.

17. A system, comprising:
    computing apparatus comprising an artificial intelligence or machine learning (AI/ML) system of a particular type, wherein:
        the AI/ML system is configured using a parts-identification model stored for a previously-trained AI/ML system of the particular type customized for identifying parts of a particular orientation or a particular structure type,
        auto-labeling is performed to generate one or more auto-labeled images using the AI/ML system based at least on one of the orientation or structure type,
        a confidence score is generated for labeling the one or more auto-labeled images based on one of a size constraint or a geometry constraint, the AI/ML system is trained using a dataset comprising the one or more auto-labeled images having a respective confidence score exceeding a specified threshold, and configuration of the currently trained AI/ML system is outputted and stored as an improved parts-identification model.

18. The system of claim 17, wherein the AI/ML system comprises one or more of a convolutional neural network, convolutional recurrent neural network, or a deep-learning network.

19. The system of claim 17, wherein the dataset comprises a training dataset comprising at least one of the one or more auto-labeled images.

20. The system of claim 17, wherein the dataset comprises a test dataset comprising at least one of the one or more auto-labeled images.

21. The system of claim 17, wherein the AI/ML system comprised in the computing apparatus is configured to:
receive a labeled image comprising one or more labeled parts; and
generate a synthetic image using at least one of the one or more labeled parts, wherein the AI/ML system rotates the at least one labeled part and changes a background of the at least one labeled part.

22. The system of claim 17, wherein the AI/ML system comprised in the computing apparatus is configured to:
receive a labeled image comprising one or more labeled parts; and
generate a synthetic image using at least two of the one or more labeled parts, wherein the AI/ML system reorientates the at least two labeled parts relative to each other.

23. The system of claim 17, wherein the AI/ML system comprised in the computing apparatus is configured to:
receive a labeled image comprising one or more labeled parts; and
generate a synthetic image using at least one of the one or more labeled parts and the AI/ML system crops the received labeled image.

24. The system of claim 17, wherein the AI/ML system comprised in the computing apparatus is configured to:
receive a labeled image comprising one or more labeled parts; and
generate a synthetic image using at least one of the one or more labeled parts, wherein the synthetic image is labeled using the selected AI/ML system configured using the parts-identification model.

25. The system of claim 17, wherein at least one of the one or more auto-labeled images comprises a structure, and the structure comprises a vehicle.

26. A system, comprising:
computing apparatus comprising an artificial intelligence or machine learning (AI/ML) based system, wherein:
the AI/ML based system customized for a type of a structure is selected,
the selecting includes configuring the untrained AI/ML based system using a parts-identification model derived from a previously-trained AI/ML system that is customized for identifying the type of the structure,
the selected AI/ML based system is configured for identifying and auto-labeling one or more parts of the structure in an input image including the type of the structure, and
the auto-labeling includes generating a confidence score for labeling the one or more parts of the structure based on one of a size constraint or a geometry constraint and using labeling data along with the confidence score in refining the AI/ML system.

27. The system of claim 26, wherein the type of the structure is obtained by the computing apparatus using a structure-type classifier, trained to identify structure types from structure images.

28. The system of claim 26, wherein:
a perspective of the input image is provided to the AI/ML based system, and
the AI/ML based system is configured to identify the one or more parts of the structure using the perspective.

29. The system of claim 28, wherein the perspective comprises a front perspective, a rear perspective, a left side perspective, or a right side perspective.

30. The system of claim 28, wherein the perspective includes a perspective classifier.

31. The system of claim 26, wherein the AI/ML based system comprises an untrained AI/ML based system configured using an AI/ML based parts-identification model that is customized for the type of the structure and that is trained for identifying one or more structure parts from one or more structure images.

32. The system of claim 26, wherein the structure comprises a vehicle.

* * * * *